United States Patent
Bourgeois et al.

(10) Patent No.: US 7,077,562 B2
(45) Date of Patent: Jul. 18, 2006

(54) WATCH HAIRSPRING AND METHOD FOR MAKING SAME

(75) Inventors: Claude Bourgeois, Bôle (CH); André Perret, Les Geneveys-sur-Coffrane (CH); Arnold Christiaan Hoogerwerf, Cormondrèche (CH)

(73) Assignee: CSEM Centre Suisse d'Electronique et de Microtechnique SA, Neuchâtel (CH)

( * ) Notice: Subject to any disclaimer, the term of this patent is extended or adjusted under 35 U.S.C. 154(b) by 0 days.

(21) Appl. No.: 10/533,442

(22) PCT Filed: Oct. 30, 2003

(86) PCT No.: PCT/CH03/00709

§ 371 (c)(1),
(2), (4) Date: May 2, 2005

(87) PCT Pub. No.: WO2004/048800

PCT Pub. Date: Jun. 10, 2004

(65) Prior Publication Data

US 2005/0281137 A1 Dec. 22, 2005

(30) Foreign Application Priority Data

Nov. 25, 2002 (EP) .................................. 02026147

(51) Int. Cl.
*G04B 17/04* (2006.01)
*F16F 1/06* (2006.01)

(52) U.S. Cl. ....................................... 368/175; 267/166

(58) Field of Classification Search ................. 368/127, 368/140, 175; 265/166
See application file for complete search history.

(56) References Cited

U.S. PATENT DOCUMENTS

| 3,696,687 A | * | 10/1972 | Harland ........................ 74/431 |
| 3,735,586 A | * | 5/1973 | Berney ........................ 368/175 |
| 3,956,881 A | * | 5/1976 | Vuille et al. ................. 368/177 |
| 4,922,756 A | | 5/1990 | Henrion |
| 5,152,851 A | * | 10/1992 | Yamamoto et al. .......... 148/333 |
| 6,101,805 A | * | 8/2000 | Wassenhoven ............... 57/408 |
| 6,863,435 B1 | * | 3/2005 | Moteki et al. .............. 368/140 |

FOREIGN PATENT DOCUMENTS

| DE | 101 27 733 A1 | 2/2003 |
| WO | WO 02 04836 A2 | 1/2002 |

OTHER PUBLICATIONS

Patent Abstracts of Japan, vol. 018, No. 408 (M-1647), Jul. 29, 1994; & JP 06 117470 A. (Yokogawa Electric Corp), Apr. 26, 1994.

(Continued)

*Primary Examiner*—Vit. W. Miska
(74) *Attorney, Agent, or Firm*—Sughrue Mion, PLLC

(57) ABSTRACT

The invention relates mainly to a hairspring intended to equip the balance wheel of a mechanical timepiece. It is in the form of a spiraled rod (10) cut from an {001} single-crystal silicon plate. Its structure and its dimensions are calculated so as to minimize the thermal drift of the hairspring/balance-wheel assembly by means of the first and second thermal coefficients of its spring constant.

11 Claims, 2 Drawing Sheets

OTHER PUBLICATIONS

Patent Abstracts of Japan, vol. 010, No. 265 (M-515), Sep. 10, 1986 & JP 61 088033 A (Kyocera Corp), May 6, 1986.

Patent Abstracts of Japan, vol. 016, No. 208 (M-1249) May 18, 1992 & JP -04 034226 (Toshiba Corp), Feb. 5, 1992.

Patent Abstracts of Japan, vol. 016, No. 501, Oct. 16, 1992 & JP 04 185698 A (Seiko Epson Corp), Jul. 2, 1992.

* cited by examiner

WATCH HAIRSPRING AND METHOD FOR MAKING SAME

The present invention relates to the regulating member in timepieces called a hairspring/balance wheel. It relates more particularly, on the one hand, to a hairspring intended to equip the balance wheel of a mechanical timepiece and, on the other hand, to a method of manufacturing this hairspring.

The regulating member for mechanical watches is composed of a flywheel, called a balance wheel, and a spiral spring, called a hairspring, fixed at one end to the staff of the balance wheel and at the other end to the balance bridge, called the cock, about which the balance wheel staff pivots.

The hairspring/balance wheel oscillates about its equilibrium- position (or dead spot). When the balance wheel leaves this position, it arms the hairspring. This creates a restoring torque which, when the balance wheel is released, makes it return to its equilibrium position. As it has acquired a certain speed, and therefore kinetic energy, it goes beyond its dead spot until the opposite torque of the hairspring stops it and obliges it to rotate in the other direction. Thus, the hairspring regulates the period of oscillation of the balance wheel.

More precisely, the balance wheel equipping the movements of mechanical watches at the present time is an elastic metal blade of rectangular cross section wound around itself as an Archimedean spiral and comprising 12 to 15 turns. It will be recalled that the hairspring is mainly characterized by its restoring torque M, expressed to a first approximation by the formula:

$$M = E/L(w^3 t/12\phi)$$

where:
- E: Young's modulus of the blade [in N/m$^2$];
- t: thickness of the hairspring;
- w: width of the hairspring;
- L: length of the hairspring;
- $\phi$: angle of twist (rotation of the pivot).

It will be readily understood that the spring constant or stiffness of a hairspring, $C=M/\phi$, which characterizes the restoring torque per unit angle of twist must be as constant as possible, in particular whatever the temperature and the magnetic field. The material used is therefore of paramount importance.

At the present time, complex alloys are used, these being complex both because of the number of components (iron, carbon, nickel, chromium, tungsten, molybdenum, beryllium, niobium, etc.) and the metallurgical processes employed. The desired objective is to obtain autocompensation of the variations in the elastic modulus of the metal by combining two counteracting effects, namely that of the temperature and that of the magnetoconstriction (the contraction of magnetic bodies due to the magnetization).

Current metal hairsprings are difficult to manufacture. Firstly, because of the complexity of the processes employed for producing the alloys, the intrinsic mechanical properties of the metal are not constant from one production run to another. Secondly, the adjustment, which is the technique used to make sure that the watch indicates at all times the most accurate time, is a tricky and lengthy operation. This operation requires many manual procedures and a great deal of defective parts have to be eliminated. For these reasons, the production process is expensive and to maintain a constant quality is a permanent challenge.

Document DE 101 27 733 discloses a silicon hairspring covered with a layer which may be made of silicon dioxide, silicon oxynitride, silicon nitride, silicon carbide or a polymer, so as to increase its thermal stability, particularly at high temperature (800° C.). However, this technique is too empirical and therefore not precise enough to allow its application to a watch hairspring.

The object of the present invention is to provide a hairspring whose thermal drift is much more finely corrected than in the above document, thereby allowing it to be used in watchmaking.

More precisely, the invention relates to a hairspring intended to equip the balance wheel of a mechanical timepiece and in the form of a spiraled rod cut from an {001} single-crystal silicon plate, the turns of which have a width w and a thickness t. According to the invention, the rod forming the hairspring is structured and dimensioned so as to minimize the temperature sensitivity through the first thermal coefficient ($C_1$) and the second thermal coefficient ($C_2$) of its spring constant C.

To minimize the first thermal coefficient, the rod comprises a silicon core and an external layer of thickness $\xi$ formed around this core and made of a material having a first thermal coefficient of Young's modulus E opposite that of silicon. Preferably, the external layer is made of amorphous silicon oxide ($SiO_2$). Its thickness is about 6% of the width w of the rod.

In order to minimize the second thermal coefficient ($C_2$), the width w of the rod is modulated, periodically, as a function of the angle $\theta$ that defines the orientation of each of its points in polar coordinates. The modulation may also, advantageously, be carried out in such a way that the local flexural stiffness of the rod is constant.

To optimize the thermal behavior of the hairspring, the thickness t of the rod, its width w, modulated in the plane of the hairspring, and the thickness $\xi$ of the silicon oxide layer have values for which the thermal drift of the spring constant C is a minimum within a given temperature range.

The invention also relates to a method for determining the optimum dimensions of the hairspring that has just been defined. This method consists, in succession, in:
- mathematically expressing the stiffness of the hairspring as a function of its thickness t, its width w modulated in the plane of the hairspring, the thickness $\xi$ of the silicon oxide layer, the elastic anisotropy of the silicon and the temperature;
- calculating the thermal behavior, in particular the first two thermal coefficients of the spring constant of the hairspring ($C_1$ and $C_2$) for all combinations of possible values of the parameters t, w and $\xi$ within a given temperature range; and
- adopting the t, w, $\xi$ combinations for which the thermal drifts of these coefficients are minimal.

The invention will be more clearly understood upon reading the following description, given with regard to the appended drawing in which.

Figure 1:
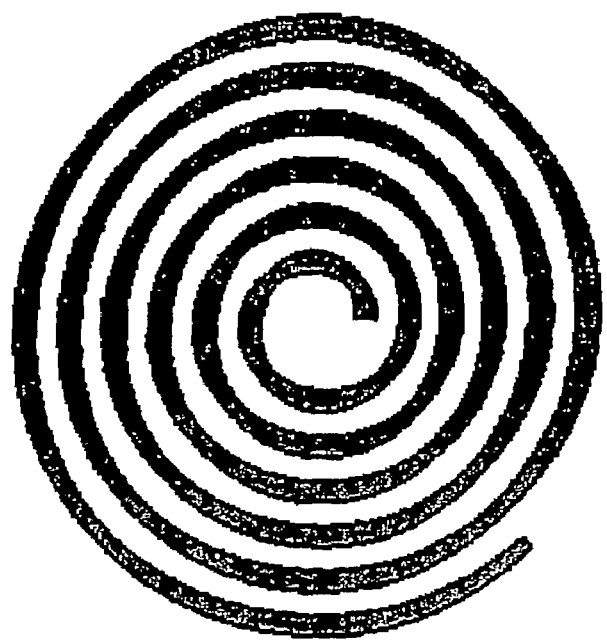
FIG. 1 shows a hairspring according to the invention.
Figure 2A:
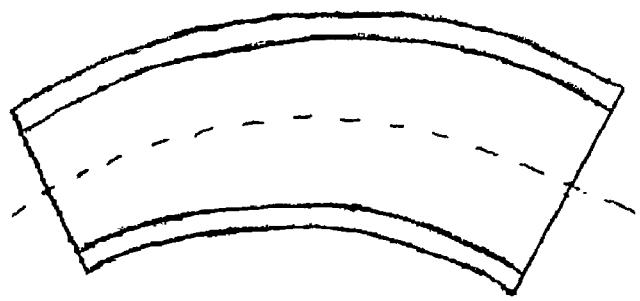
FIG. 2 shows a segment of this hairspring, in longitudinal section at a and in cross section at b, so as to illustrate the references of the parameters used in the description.
Figure 2B:
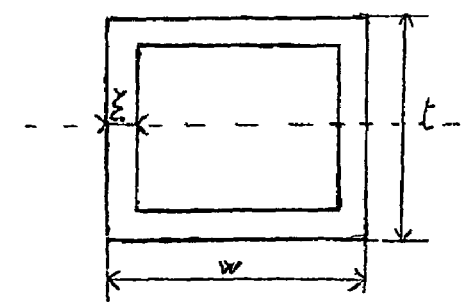

The hairspring according to the invention, shown at 10 in FIGS. 1 and 2, is a rod cut into a spiral, obtained by the machining, for example by plasma machining, of an {001} single-crystal silicon plate. This material is nonmagnetic and shapeable as required, and allows low manufacturing costs to be achieved.

Unfortunately, it should be pointed out that it is difficult to obtain a silicon hairspring with a constant spring constant C since the Young's modulus E of this rod is greatly influenced by the temperature. It is therefore essential to compensate for this effect.

When the temperature sensitivity of an elastic structure is modeled, it is common practice to use the thermal coefficients of its spring constant C such that they form a mathematical series of the type:

$$C = C_0(1 + C_1 \Delta T + C_2 \Delta T^2 \ldots),$$

in which $C_0$ is the nominal value of the spring constant C and $C_1$ and $C_2$ are its first and second thermal coefficients, respectively. Only the first two coefficients are taken into account here, the other ones being negligible.

It will therefore be understood that, in order to obtain a temperature-insensitive spring constant C, the aim is to minimize the thermal coefficients $C_1$ and $C_2$.

Figure 3:
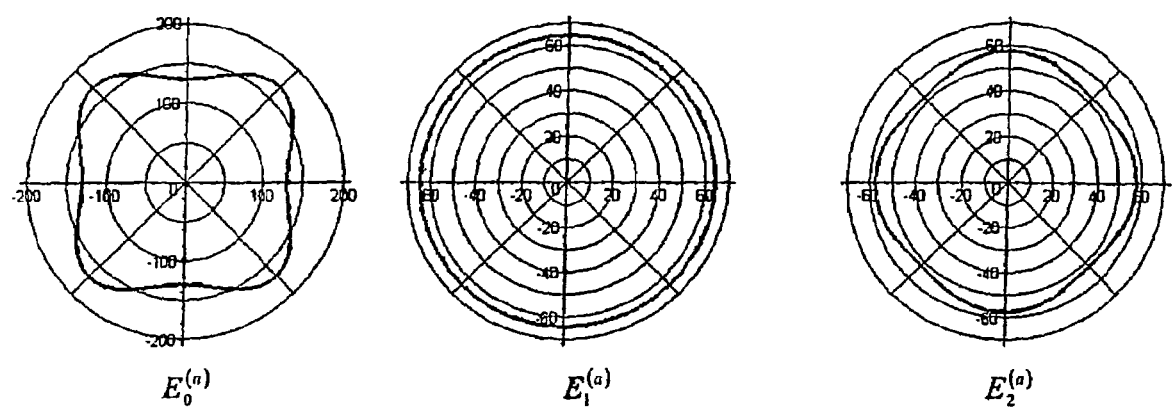
FIG. 3 illustrates the anisotropy of Young's modulus in the {001} plane of the silicon.

It should be recalled that single-crystal silicon exhibits crystalline anisotropy. In the {001} plane, the <110> direction is stiffer than the <100> direction, which, of course, affects the flexural stiffness of the hairspring 10. The Young's modulus $E^{(a)}$ of the {001} plane of silicon may be expressed, like the spring constant, by a mathematical series of the type:

$$E^{(a)} = E_0^{(a)}(1 + E_1^{(a)} \Delta T + E_2^{(a)} \Delta T^2),$$

in which $E_0^{(a)}$ is the nominal value of the Young's modulus $E^{(a)}$, and $E_1^{(a)}$ and $E_2^{(a)}$ are its first and second thermal coefficients, respectively. These three coefficients are shown in particular in FIG. 3 as a function of the orientation relative to the crystallographic axes.

The first thermal coefficient $E_1^{(a)}$ of the Young's modulus has a highly negative value (about −60 ppm/° C.) and the nominal value of the Young's modulus $E_0^{(a)}$ is 148 GPa in the <100> direction of the {001} plane. The thermal drift of a silicon hairspring is thus about 155 seconds/day within the watch range of 23° C.±15° C. This makes it incompatible with watch requirements, which are around 8 seconds/day.

To compensate for this drift, the hairspring 10 according to the invention is formed from a silicon core 12 and an outer layer 14 made of $SiO_2$, the first thermal coefficient $E_1^{(b)}$ of which is highly positive. It is about +215 ppm/° C. and the nominal value of the stiffness $E_0^{(b)}$ is about 72.4 GPa.

This symmetrical trilayer structure, obtained by thermal oxidation using any known process, thus makes it possible to act on the thermal stability of the overall stiffness of the hairspring in in-plane flexure.

It may be shown that, for a hairspring cut in the {001} plane, optimum minimization of the first thermal coefficient $C_1$ of the spring constant of the hairspring occurs when the thickness of the oxide layer 14 represents about 6% of the width of the hairspring.

According to the invention, the second thermal coefficient $C_2$ may be minimized by modulating the width w of the spiral, which is the dimension lying in its winding plane, as a function of the angle θ that characterizes the orientation of each of its points in polar coordinates.

As shown in FIG. 1, the modulation may be achieved by making the hairspring thinner in the stiff <110> direction and thicker in the less stiff <100> direction. It is thus possible to compensate for the anisotropy of silicon and obtain a constant local flexural stiffness. The hairspring is then said to be elastically balanced.

In this particular case, letting $w_0$ be a reference width of the hairspring in the {001} plane, the width w varies as a function of the angle θ according to the equation:

$$w = w_0 \sqrt[3]{1 - \frac{1 - \frac{\bar{s}_{12,0}}{\bar{s}_{11,0}} - \frac{1}{2}\frac{\bar{s}_{44,0}}{\bar{s}_{11,0}}}{2} \sin^2(2\theta)} \text{ [in m]}$$

in which $\bar{s}_{11}$, $\bar{s}_{44}$ and $\bar{s}_{12}$ are the three independent elastic coefficients of silicon along the crystallographic axes, which are known to those skilled in the art, as defined in the publication by C. Bourgeois et al., "Design of resonators for the Determination of the Temperature Coefficients of Elastic Constants of Monocrystalline Silicon" (Proc. 51st Annual Frequency Control Symposium, 1997, 791–799).

More specifically, it will be readily understood that several parameters are involved interdependently and that, for example, the improvement in the thermal behavior obtained with a certain modulation of the width w will not be the same for all the oxide thicknesses and for all the crystalline orientations of the hairspring.

To make it easier to determine the optimum values of the various parameters, the method according to the invention consists in examining, for example, the variability of the thermal coefficients of the spring constant C of a hairspring as described above as a function of these parameters.

The parameters involved in the determination of C are the Young's modulus $E^{(a)}$ of silicon, the Young's modulus $E^{(b)}$ of silicon oxide and the geometrical quantities illustrated in FIG. 2:

t=thickness of the hairspring (a constant), [in m]
w=width of the hairspring in the {001} plane, [in m]
ξ=thickness of the oxide (a constant), [in m].

According to the multilayer theory, the equivalent Young's modulus E in flexure of a silicon rod covered with a silicon oxide layer may be modeled in a local section by the following equation:

$$E = (E^{(a)} - E^{(b)})\left(1 - \frac{2\xi}{w}\right)^3\left(1 - \frac{2\xi}{t}\right) + E^{(b)}$$

Since in the case of the hairspring 10 ξ/w<<1 and ξ/t<<1, the equation becomes:

$$E = E^{(a)} - (E^{(a)} - E^{(b)})\left(\frac{6\xi}{w} + \frac{2\xi}{t}\right).$$

The spring constant C of the hairspring and its first two thermal coefficients $C_1$ and $C_2$ are determined by integrating, over its entire length, the expression for the local stiffness, which itself is a function of the expressions for E, t, w and ξ.

It may be demonstrated therefore that the first thermal coefficient $C_1$ is essentially a function of ξ, whereas the second thermal coefficient $C_2$ depends most particularly on w.

Next, there then remains only to calculate, by means of a computer, the values of the thermal coefficients $C_1$ and $C_2$ for all combinations of possible values of the parameters t, w and ξ. The (t, w, ξ) triplets for which the thermal drift of the spring constant C of the hairspring is a minimum in a given temperature range are extracted from the set of possible combinations.

It is then possible to choose the triplet corresponding to the hairspring whose spring constant C, determined using the formula given above, is best suited to the desired watch application.

Finally, the hairspring may be produced using the information provided by the calculation.

Thus, a silicon hairspring is proposed whose temperature sensitivity is reduced to the minimum. It is ready to be used and requires no adjustment, nor any special manual operation.

The above description is merely one particular and non-restrictive example of a silicon-based hairspring according to the invention. Thus, just the thermal compensation provided by the oxide layer is already satisfactory for use in mid-range watches and the modulation of the width w is optional.

The invention claimed is:

1. A new hairspring intended to equip the balance wheel of a mechanical timepiece and in the form of a spiraled rod (10) cut from an {001} single-crystal silicon plate having a first thermal coefficient ($C_1$) and a second thermal coefficient ($C_2$) of its spring constant C, the turns of said hairspring having a width w and a thickness t, characterized in that said rod comprises a silicon core (12) and an external layer (14) of thickness $\xi$ formed around the silicon core and made of a material having a first thermal coefficient of the Young's modulus of opposite sign to that of the silicon.

2. The hairspring as claimed in claim 1, characterized in that said external layer (14) is made of amorphous silicon oxide ($SiO_2$).

3. The hairspring as claimed in claim 1, characterized in that the dimensional ratio $\xi/w$ is defined so as to obtain a first thermal coefficient ($C_1$) of its spring constant C of predetermined value.

4. The hairspring as claimed in claim 3, characterized in that the dimensional ratio $\xi/w$ is defined so as to minimize the first thermal coefficient ($C_1$) of its spring constant C.

5. The hairspring as claimed in claim 4, characterized in that the dimensional ratio $\xi/w$ is about 0.06.

6. The hairspring as claimed in claim 1, characterized in that the width of said rod is modulated, periodically, as a function of the angle θ that defines the orientation of each of its points in polar coordinates in order to minimize the second thermal coefficient ($C_2$).

7. The hairspring as claimed in claim 5, characterized in that the width of said rod is modulated so that its local flexural stiffness is constant in order to minimize the second thermal coefficient ($C_2$).

8. The hairspring as claimed in claim 7, characterized in that the modulation is effected according to the formula:

$$w = w_0 \sqrt[3]{1 - \frac{1 - \frac{\bar{s}_{12.0}}{\bar{s}_{11.0}} - \frac{1}{2}\frac{\bar{s}_{44.0}}{\bar{s}_{11.0}}}{2} \sin^2(2\theta)}$$

in which $\bar{s}_{11}$, $\bar{s}_{44}$ and $\bar{s}_{12}$ are the three independent elastic coefficients of silicon along the crystallographic axes.

9. The hairspring as claimed in claim 6, characterized in that, in order to minimize the first thermal coefficient ($C_1$) and the second thermal coefficient ($C_2$), the thickness t of the rod, its width w in the {100} plane and the thickness $\xi$ of the silicon oxide layer have values for which the thermal drift of the spring constant C of the hairspring is a minimum within a given temperature range.

10. A method for determining the optimum dimensions of the hairspring as claimed in claim 9, characterized in that it consists, in succession, in:

mathematically expressing the stiffness of the hairspring as a function of its thickness t, its width w modulated in the plane of the hairspring, the thickness $\xi$ of the silicon oxide layer, the elastic anisotropy of the silicon and the temperature;

calculating the thermal behavior, in particular the first two coefficients ($C_1$, $C_2$) of the spring constant of the hairspring for all combinations of possible values of the parameters t, w and $\xi$ within a given temperature range; and adopting the t, w, $\xi$ combinations for which the thermal drifts of said coefficients ($C_1$ and $C_2$) are minimal.

11. The method as claimed in claim 10, characterized in that it consists, finally, in calculating the width w of the spiral at any point from the formula:

$$w = w_0 \sqrt[3]{1 - \frac{1 - \frac{\bar{s}_{12.0}}{\bar{s}_{11.0}} - \frac{1}{2}\frac{\bar{s}_{44.0}}{\bar{s}_{11.0}}}{2} \sin^2(2\theta)}$$

in which $\bar{s}_{11}$, $\bar{s}_{44}$ and $\bar{s}_{12}$ are the three independent elastic coefficients of silicon along the crystallographic axes.

* * * * *